Jan. 16, 1940.  N. M. NESSET  2,186,987
FILTER FLOW DEVICE
Filed Aug. 5, 1938

Inventor:
Naurice M. Nesset,
By Critton, Wiles, Davies, Hirschl & Dawson,
Attys.

Patented Jan. 16, 1940

2,186,987

UNITED STATES PATENT OFFICE 2,186,987

FILTER FLOW DEVICE

Naurice M. Nesset, Glenview, Ill., assignor to Baxter Laboratories, Inc., Glenview, Ill., a corporation of Delaware Application August 5, 1938, Serial No. 223,312

6 Claims. (Cl. 210—164)

This invention relates to a visual filtering device for blood and other liquids.

In the transfusion of blood or in the injection of banked blood, it is extremely important that all blood clots be eliminated while at the same time all of the blood free from clot utilized. It is also important that the physician be able to determine the rate of flow of the blood which is to enter the vein and to be able to detect immediately the presence of blood clot in the equipment.

An object of the present invention is to provide a simple structure wherein filtering of the blood is accomplished in such a way that the stopping of the filter or a portion thereof is evident and is immediately detected while at the same time the rate of flow of filtered blood, free of clot, is readily determined. A further object is to provide simple apparatus, of very few parts, which can be readily disassembled for purifying and then reassembled, the parts forming when assembled substantially a unitary compact structure and providing therein filtering means as well as drip means. Other specific objects and advantages will appear as the specification proceeds.

The invention is illustrated in a further embodiment, by the accompanying drawing, in which—

Figure 1:
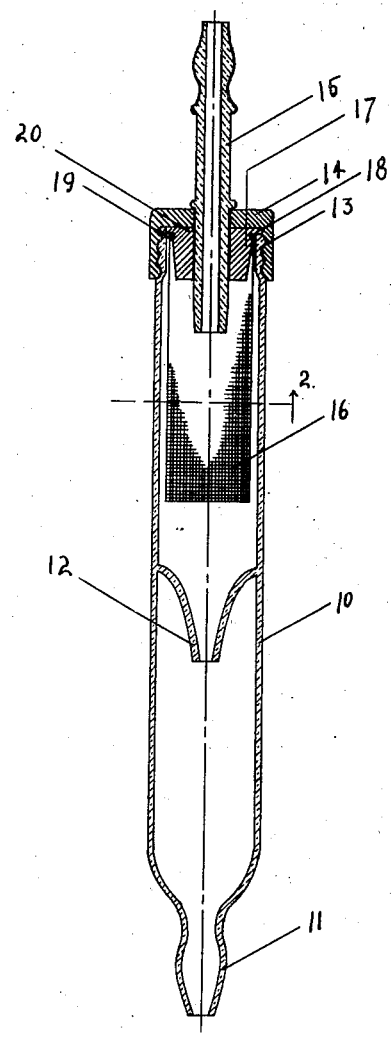
Figure 2:
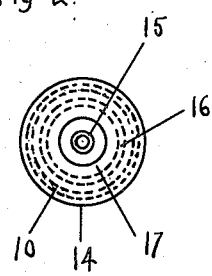

Figure 1 is a longitudinal sectional view of tube apparatus embodying my invention; and Fig. 2 is a transverse sectional view, the section being taken as indicated at line 2 of Fig. 1.

In the illustration given, 10 designates a tube which may be formed of glass, transparent composition materials, etc. The tube 10 is provided at its lower end with an integral tube-receiving extension 11. Centrally and interiorly, the tube 10 is provided with an integral and downwardly extended drip tube 12. The upper end of the tube is provided with molded threads 13 which receive an interiorly threaded closure cap 14 formed of hard rubber, Bakelite, or other resin condensation products, etc. The cap 14 is centrally apertured to receive the tube 15 through which the blood or other liquid is introduced into the filter tube 10.

Within the filter tube 10 is supported a filter 16 which may be located at any suitable point so as to filter the blood passing through the tube. In the illustration given, the filter 16 is supported in the upper portion of the tube, being held in position by a resilient plug 17. The plug 17 is provided with a lateral flange 18 resting upon the top edge of tube 10 and is firmly held in engagement therewith by the threaded cap 14.

The filter tube 16 may be formed of any suitable material adapted for filtering blood or other liquids. It may be formed of cloth, metal mesh or any other suitable filtering medium. In the illustration given, it consists of a screen or mesh formed of stainless steel and joined to form a tube having its upper end open and its lower end closed by mesh or screen. The upper end of the filter 16 is provided with an inwardly extending ring 19 which is received within a corresponding recess 20 in the plug 17.

Operation

In the operation of the device, an inlet rubber tube is secured to the upper end of glass tube 15. A similar rubber tube is secured to the outlet extension 11 and leads to an injection needle. A suitable valve or clamp (not shown) is employed for controlling the rate of flow of the blood. The blood enters tube 10 through inlet tube 15 and passes through the filter 16, dripping downwardly into the constriction tube 12 from which it flows in a central stream into the lower portion of tube 10. Thus the physician can see the exact rate of flow of the filtered blood from the centrally disposed drip tube 12 while at the same time, if clotting occurs in the filter or prior to its entrance into tube 10, the physician can at once see the presence of the clot and the extent of the clotting. If the clotting is slight, the filtering operation can continue. Should the clotting be extreme, this can be determined visually by the physician and the transfusion operation may be interrupted and a new filter substituted.

It will be observed that in the transfusion operation, the filtering is carried on entirely within the sealed tube 10 so that there is no possibility for infection of the liquid. Under no circumstances is blood clot allowed to enter the veins. Should the clotting be severe, the filter 16 will prevent any blood whatever from passing through. The physician can detect the presence of clotting not only by the reduced flow through the drip tube 12 but also through the inspection of the filter itself.

The parts are readily disassembled for cleaning and sterilizing. The cap 14 is removed with the tube 15. The plug 17 may then be lifted out of tube 10, carrying with it the filter 16. The filter is released from plug 17 by pulling the same downwardly. The separate parts may then be readily cleaned and sterilized. In assembly, the sterilized filter 16 may be lifted by a sterile cloth and pressed into engagement with tube 17 so that the ring 19 engages the recess 20. The plug 17 is then dropped into position, as illustrated, and the cap 14 screwed into sealing relation so that the flange 18 is compressed against the top edge of tube 10.

While I have shown a specific embodiment and a preferred arrangement of the filter, it will be understood that such details may be modified considerably, the location of the filter within the tube being changed, modified means for supporting the filter being employed, and filters of various shapes and materials being used. It will also be obvious that many different types of filter supporting means and sealing closures may be used.

The foregoing disclosure has been given for purpose of illustration only, and no unnecessary limitations should be understood therefrom, but the appended claims should be construed as broadly as permissible, in view of the prior art.

I claim:

1. In visual filtering apparatus of the character set forth for blood and other liquids, a transparent tube provided with a drip tube centrally disposed therein whereby a central stream of liquid within the tube is made visible, a filter supported within said tube, inlet and outlet connections for said tube, and means for supporting said filter within said tube whereby all the liquid passing into said tube is caused to pass through said filter.

2. In filtering and drip apparatus of the character set forth for blood and other liquids, a transparent tube provided with a central drip therein, said tube being provided with an outlet connection at its bottom, a removable closure for the top of said tube, means for introducing liquid into the top portion of said tube, and a filter suspended within said tube so as to filter all incoming liquid.

3. Liquid filtering and drip apparatus of the character set forth comprising: a transparent tube provided with an inlet and an outlet, a filter suspended within said tube so as to receive all inflowing liquid, and a drip tube within said tube for directing a small stream of liquid centrally therein for indicating the rate of flow.

4. In drip and filter apparatus of the character set forth, a transparent tube equipped at its lower end with an outlet tube connection and at an intermediate point with an integral inwardly and downwardly extending drip tube, a closure for the upper portion of said tube, a filter within said tube, and means cooperating with said closure for suspending said filter from the top portion of said tube, said closure being provided with an inlet through which liquid enters said filter.

5. In filtering and drip apparatus of the character set forth, a transparent tube provided at its lower end with an outlet tube connection and provided centrally with an inwardly and downwardly extending drip tube, a resilient plug closing the top of said tube, a cap engaging said tube and sealing said resilient plug against said tube, an inlet tube extending through said cap and plug, and a filter suspended from the top portion of said tube and held by said plug.

6. In filtering and drip apparatus of the character set forth, a transparent tube provided at its lower end with an outlet tube extension and provided at an intermediate point with an inwardly and downwardly extending drip tube, a rubber plug equipped with flanges resting upon the top edge of said tube, a closure cap threadedly engaging the upper portion of said tube and clamping the flange of said plug against the top edge of said tube, a filter within said tube having its upper portion interlockingly engaged with said plug and an inlet tube extending centrally through said cap and said plug.

NAURICE M. NESSET.